United States Patent
Cathcart et al.

[11] Patent Number: 5,937,974
[45] Date of Patent: Aug. 17, 1999

[54] SPRING APPLIED PARKING BRAKE ACTUATOR HAVING A COLLET STYLE SLACK ADJUSTER

[75] Inventors: Christopher A. Cathcart, Spartanburg; Roland S. Moore, Taylors, both of S.C.

[73] Assignee: Westinghouse Air Brake Company, Wilmerding, Pa.

[21] Appl. No.: 08/850,599

[22] Filed: May 2, 1997

[51] Int. Cl.$^6$ .................................................. F16D 65/56
[52] U.S. Cl. ................ 188/203; 188/196 V; 188/153 R; 188/170; 92/130 A
[58] Field of Search .................................. 92/63, 130 A; 188/153 D, 153 R, 170, 196 D, 196 V, 202, 203; 303/6.01, 9.61, 9.76

[56] References Cited

U.S. PATENT DOCUMENTS

| | | | |
|---|---|---|---|
| 4,361,078 | 11/1982 | Cape et al. | 92/31 |
| 4,364,305 | 12/1982 | Dalibout et al. | 188/170 |
| 4,478,319 | 10/1984 | Casalone et al. | 188/170 |
| 4,493,246 | 1/1985 | Dalibout | 92/13.8 |
| 4,649,804 | 3/1987 | Oberlander | 92/63 |
| 4,796,513 | 1/1989 | Hata et al. | 92/130 A |
| 5,423,401 | 6/1995 | Noah et al. | 188/203 |

*Primary Examiner*—Chris Schwartz
*Attorney, Agent, or Firm*—James Ray & Associates

[57] ABSTRACT

A brake actuator for use on passenger transit railway vehicles, is disclosed. The actuator includes a housing containing a service piston and a parking brake piston. The service piston is connected to an inner hollow stem having a forward conical surface disposed to engage a conical surface of a collet provided on a threaded rod located within the stem. The parking brake piston has a hollow outer sleeve surrounding the hollow stem, while a coil spring is located about the outer sleeve for applying a braking force when fluid pressure is removed from a housing containing the parking brake piston. The spring expands against a locking ring located on a forward sleeve secured to an intermediate sleeve that engages the hollow stem. This causes forward movement of the outer sleeve and forward movement of the conical portion of the hollow stem into engagement with the conical portion of the conical surface of the collet. This, in turn, moves the threaded rod to engage brake applying components of a transit vehicle.

6 Claims, 4 Drawing Sheets

SPRING APPLIED PARKING BRAKE ACTUATOR HAVING A COLLET STYLE SLACK ADJUSTER

FIELD OF THE INVENTION

The present invention relates to a novel parking brake actuator that can be incorporated in the service brake actuator disclosed in U.S. Pat. No. 5,423,401 to Lewis Noah et al. which patent is assigned to the assignee of the present invention.

BACKGROUND OF THE INVENTION

The Noah et al. patent discloses a pneumatic actuator having a single service piston that applies the braking mechanisms of passenger railway transit vehicles and the like. The service piston of Noah et al. has a hollow stem located around a threaded shaft provided with power and brake adjusting collets threaded on the shaft. The brake adjusting collet provides adjustment for excess wear of brake shoe and other components of the transit vehicle. The disclosure of the Noah patent is incorporated herein by reference.

SUMMARY OF THE INVENTION

The present invention adds a pneumatic parking brake feature to the brake actuator and service piston of the Noah et al. patent. This is accomplished by locating a second piston in front of the service piston and around the hollow stem of the service piston. A coil spring is located between a forward wall of a housing portion containing the second piston and a locking ring seated in a circumferential groove provided in a forward sleeve. When pressurized fluid is removed from the housing portion containing the second piston, the piston and forward sleeve move forward to engage the hollow stem of the service piston thereby forwardly translating the hollow stem. Such forward translation of the hollow stem causes a conical bearing surface on the stem to engage the power collet located on the threaded shaft that, when thrust forward, operates braking means located on the railway vehicle, i.e., the conical surface acting upon the collet thrusts the threaded rod forward to apply the brakes of the vehicle.

OBJECTIVES OF THE INVENTION

A primary objective of the present invention is to provide a pneumatic dynamic braking system with a parking brake application.

Another objective of the invention is to provide the above parking brake application in combination with an adjustable collet that allows adjustment to the brake actuator in response to wear of braking components.

In addition to the objectives and advantages of the invention which have been described in some detail above, various other objectives and advantages will become more apparent to those skilled in the railway and other type vehicle braking art from the following more detailed description of the invention, particularly, when such description is considered with the attached drawing figures and the appended claims.

BRIEF DESCRIPTION OF THE DRAWINGS

Prior to proceeding to a more detailed description of the invention, it should be pointed out that identical components having identical functions have been identified with identical reference numerals throughout the figures of the drawings.

PREFERRED EMBODIMENT

Figure 1:
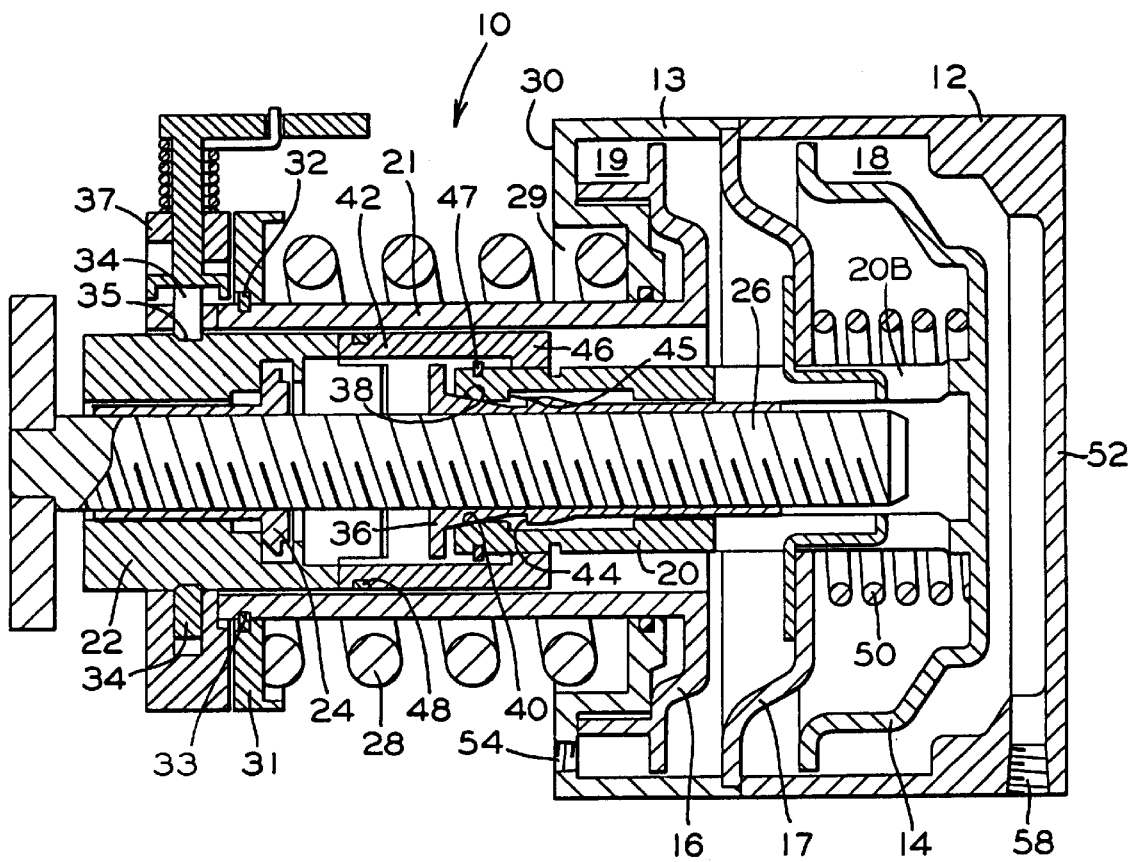
FIG. 1 is a side elevation and partial sectional view of the actuator of the invention in which the supply of operating fluid has been removed from the service and parking brake pistons of the actuator.

Referring now to the drawings, FIG. 1 shows a fluid operated actuator 10 of the invention in longitudinal section. Actuator 10 includes hollow cylindrical housing portions 12 and 13 containing, respectively, a service piston 14 and a parking brake piston 16. Housing portions 12 and 13 can be secured together by bolts (not visible in the drawings) to provide a generally unitary housing structure. Between the pistons is a wall portion 17 that separates the housing portions into sealed compartments 18 and 19 which house, respectively pistons 14 and 16. Service piston 14 is connected to an inner hollow stem 20 (with slot 20B being provided in the stem) while parking brake piston 16 is connected to an outer hollow sleeve 21 surrounding stem 20. At the forward end of actuator 10 and inside of the forward end of surface of sleeve 21 is an additional sleeve 22. Sleeve 22 is disposed about an adjustable collet 24. Collet 24 is seated on an internally located threaded rod 26 that operates the braking apparatus (not shown) of a railway type vehicle when rod 26 is thrust outwardly from the actuator by service piston 14 or by a relatively large coil spring 28 located about outer sleeve 21. The spring has a right hand end (in the drawings) seated in a recess 29 provided in a forward wall 30 of housing 13. The spring is held between the forward wall 30 of housing 13 and a circular spring seat 31 held in place by a retaining ring 32 located in a circumferential groove 33 provided in the outer surface of sleeve 21. A locking ring 34 is situated in front of the forward end of outer sleeve 21 and seats in a circumferential groove 35 provided in the external surface of forward sleeve 22. The forward end of sleeve 21 is shown abutting against a circular housing structure 37 surrounding ring 34. Housing 37 and spring seat 31 are secured together in a manner not visible in the Figures. The housing and seat can, for example, be bolted together.

A second, power collet 36 is also located on rod 26 at a location behind adjustable collet 24. Collet 36 has a conical bearing surface 38 that faces outwardly toward corresponding conical bearing surface 40 of stem 20. In addition, collet 36 and stem 20 have respective abutting ledges 44 and 45 at a location behind conical surfaces 38 and 40.

Figure 4:
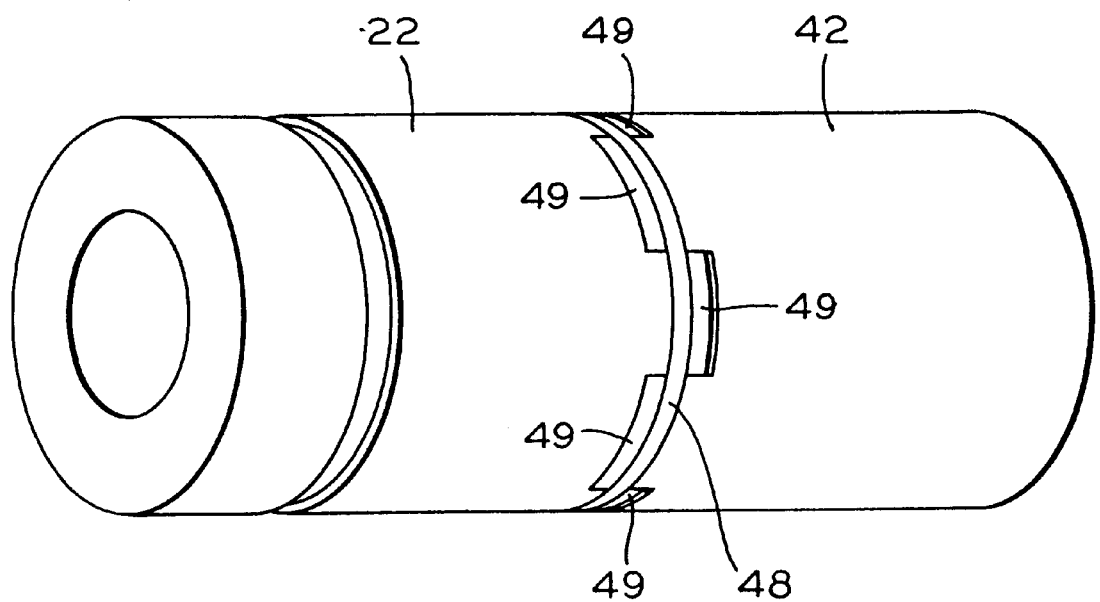
FIG. 4 is a perspective view of two sleeves used in the actuator of FIGS. 1 to 3 and means for connecting the sleeves together.

An intermediate sleeve 42 is located between outer sleeve 21 and hollow stem 20. Intermediate sleeve 42 is provided with an inwardly directed boss 46 that seats behind a retaining ring 47 located on inner stem 20. The forward end of the intermediate sleeve and the rearward end of forward sleeve 22 are, respectively, provided with integral longitudinal teeth, 49 sized to mate together, as shown in FIG. 4. The teeth are provided with circumferential grooves that are aligned when the teeth are suitably mated such that a second retaining ring 48 is seatable in the circumferential grooves, as shown in FIG. 4, which locks the sleeves together.

A second coil spring 50 is located in compartment 18, between partition 17 and a closed end wall 52 of cylindrical housing 12, for returning piston 14 to the end wall when fluid pressure is removed from compartment 18.

The parking brake portion of actuator 10 operates in the following manner.

Figure 2:
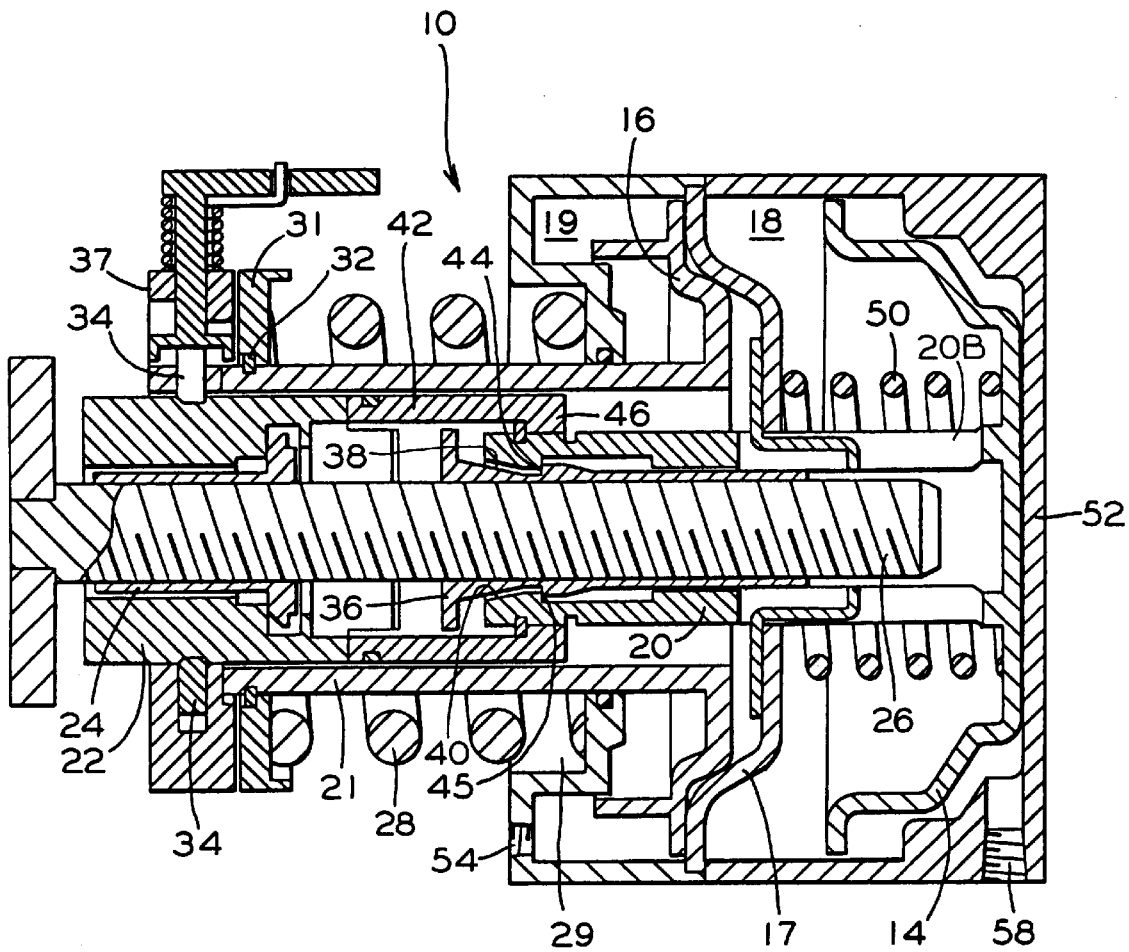
FIG. 2 is a side elevation and partial sectional view of the actuator of the invention in which operating fluid is applied only to the parking brake actuator.

Initially, as shown in FIG. 2 of the drawings, fluid pressure is removed from service piston 14 such that spring 50 maintains the piston against end wall 52. An appropriate pressurized fluid, such as air, is sent to compartment 19 of actuator 10 through a port 54 provided in forward wall 30 of housing 13 from a source of pressurized fluid (not shown). The fluid pressure is applied to the forward face of piston 16 forcing the piston to the rear of compartment 19 and toward partition 17, as shown further in FIG. 2. Rearward travel of the piston moves outer sleeve 21 in a rearward direction, and since retaining ring 32 connects spring seat 31 to outer sleeve 21, and locking ring 34 is seated in groove 35 of forward sleeve 22, with housing 37 connected to seat 31, the rearward movement of sleeve 21 translates sleeves 22 and 42 to the rear also. This translates inner stem 20 toward the rear of housing 12 which moves ledge 45 of the stem into abutment with ledge 44 of collet 36 to translate threaded rod 26 toward the rear of housing 12. This position of rod 26 is an "off" or reset condition of the parking brake of the invention.

In FIG. 1, fluid pressure is removed from parking brake piston 16 and coil spring 28 thereby expands against retaining ring 32 to forwardly translate outer sleeve 21 and positions piston 16 in a forward location in compartment 19. The forward translation of the outer sleeve causes forward sleeve 22 and intermediate sleeve 42 to travel forwardly such that the boss 46 of the intermediate sleeve engages retaining ring 47 located on stem 20. This translates inner stem 20 forwardly and inside of intermediate sleeve 42 such that the conical surface 40 of the stem engages the conical surface 38 of power collet 36. This drives rod 26 forwardly with sleeve 22 and thus into engagement with brake applying components (not shown) of the vehicle. Spring 28 maintains parking brake application until fluid pressure is reapplied to piston 16 via port 54. When fluid pressure is reapplied, piston 16 is returned to the rear of housing 13 and outer sleeve is moved with the piston to compress spring 28 and return threaded rod 26 to a non-parking brake application in the manner described above, in reference FIG. 2 of the drawings.

Figure 3:
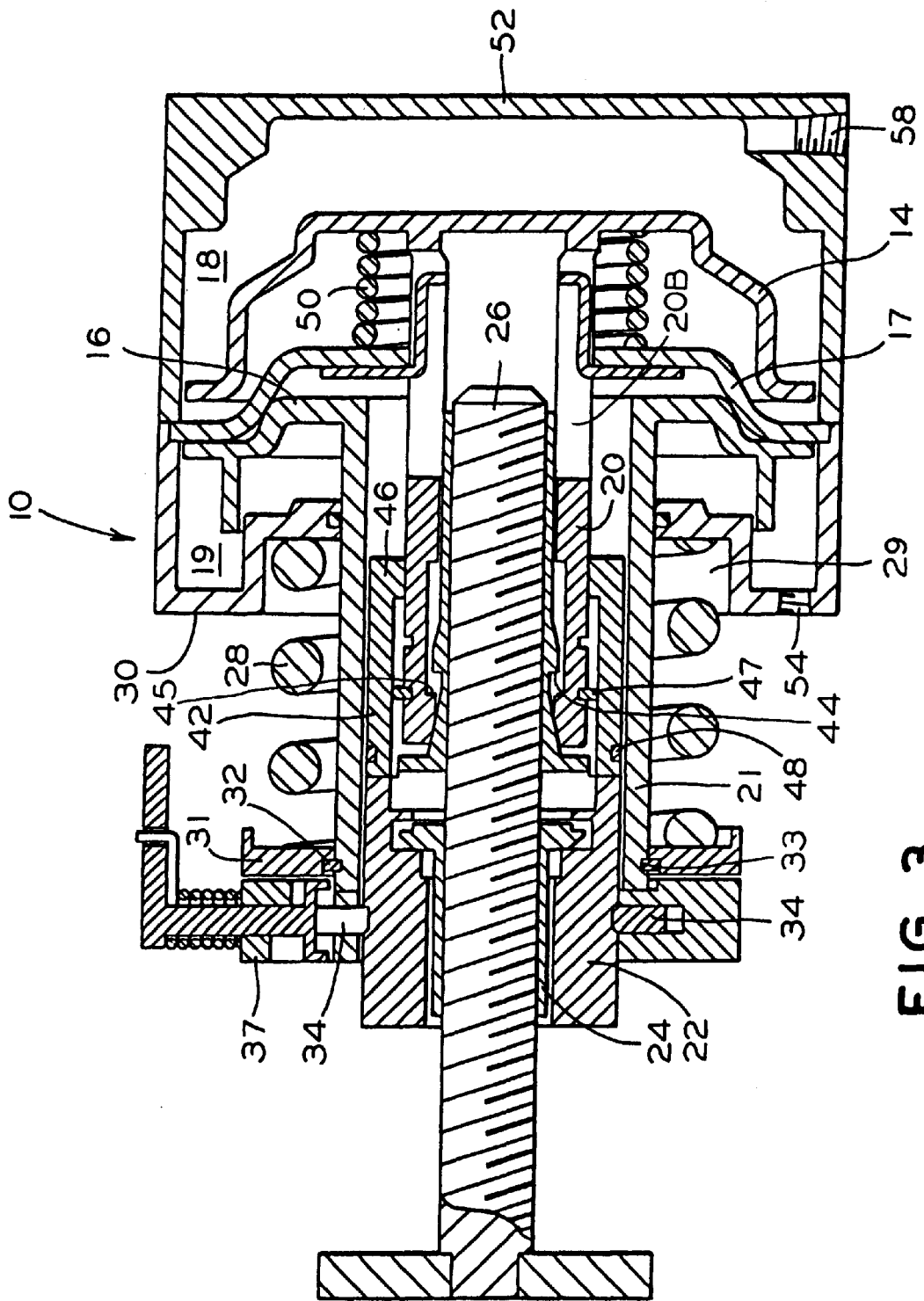
FIG. 3 is the actuator of FIGS. 1 and 2 showing the service piston activated to apply the brakes of a railway type vehicle.

The service brake operates with the application of fluid pressure to compartment 18 via port 58 in housing 12. The fluid pressure is directed between the piston and end wall 52 of the housing to drive the piston in a forward direction, as seen in FIG. 3. Forward movement of the piston translates inner stem 20 forwardly such that its conical surface 40 engages conical surface 38 of collet 36 to drive threaded rod 26 into engagement with braking components of the vehicle. The service brakes remain applied until fluid pressure is removed from compartment 18 and return spring 50 expands to move piston 14 to the rear of housing 12.

While a preferred embodiment of the brake actuator of the invention has been described in detail above with particular reference to the drawings, it should be understood that modifications and adaptations of the invention may be made by those persons skilled in the passenger transit vehicle art without departing from the spirit and scope of the appended claims.

We claim:

1. A brake actuator for use on passenger transit railway vehicles, said actuator comprising:

housings containing, respectively, a service piston and a parking brake piston, an inner hollow stem connected to said service piston and having a forward conical portion disposed to engage a conical surface of a collet provided on a threaded rod located within the hollow stem, an outer hollow sleeve surrounding said hollow stem and connected to said parking brake piston, a hollow sleeve located forwardly of and connected to said stem, and a first coil spring located about the outer sleeve and contained between a forward wall of said housings and a locking ring seated in a circumferential groove provided in the hollow sleeve located forwardly of said stem, said spring being effective to apply a braking force when fluid pressure is removed from the housing containing said parking brake piston by expanding against the locking ring and thereby moving said outer sleeve and the conical portion of said hollow stem into engagement with the conical surface of said collet for effecting forward, brake applying travel of the threaded rod.

2. The brake actuator of claim 1 including an intermediate sleeve located between the inner hollow stem and the outer hollow sleeve, said intermediate sleeve and said hollow stem having means that mechanically engage when the outer sleeve is moved forwardly in a parking brake application of the actuator.

3. The brake actuator of claim 2 wherein the hollow sleeve located forwardly of said stem is secured to the intermediate sleeve by a second retaining ring located in a circumferential groove provided in outer surface of said intermediate sleeve.

4. The brake actuator of claim 2 wherein the engaging means of the intermediate sleeve and the hollow stem includes an integral boss of said intermediate sleeve disposed behind a first retaining ring located on the hollow stem.

5. The brake actuator of claim 1 wherein the inner hollow stem and the collet are provided with abutting surfaces for returning the threaded rod to a non-parking brake position when such fluid pressure is applied to the parking brake piston.

6. The brake actuator of claim 1 wherein a second coil spring is located about the hollow stem for returning the service piston to a non-braking position when such fluid pressure is removed from the service piston.

* * * * *